Jan. 21, 1964  G. E. JARLAN  3,118,282
BREAKWATER STRUCTURES
Filed May 16, 1960  3 Sheets-Sheet 1
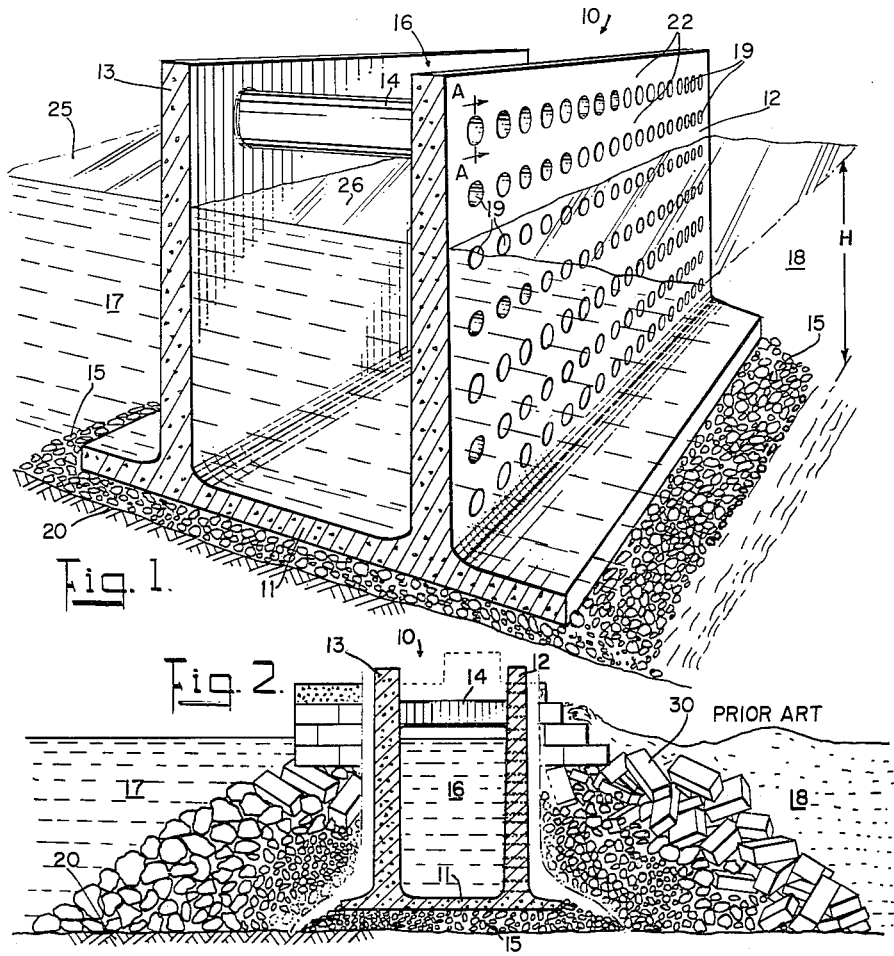
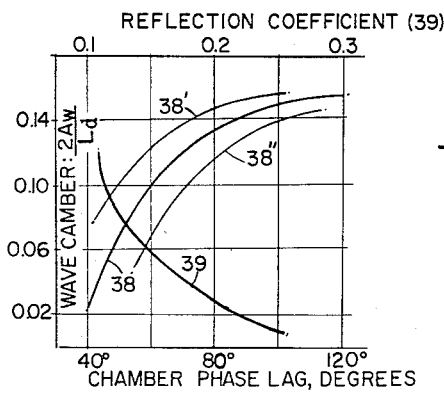
INVENTOR
GERARD EUGENE JARLAN
by R. J. Filipkowski
AGENT Jan. 21, 1964    G. E. JARLAN    3,118,282
BREAKWATER STRUCTURES
Filed May 16, 1960    3 Sheets-Sheet 2

INVENTOR
GERARD EUGENE JARLAN
by R. J. Filipkowski   AGENT

Jan. 21, 1964 G. E. JARLAN 3,118,282
BREAKWATER STRUCTURES
Filed May 16, 1960 3 Sheets-Sheet 3
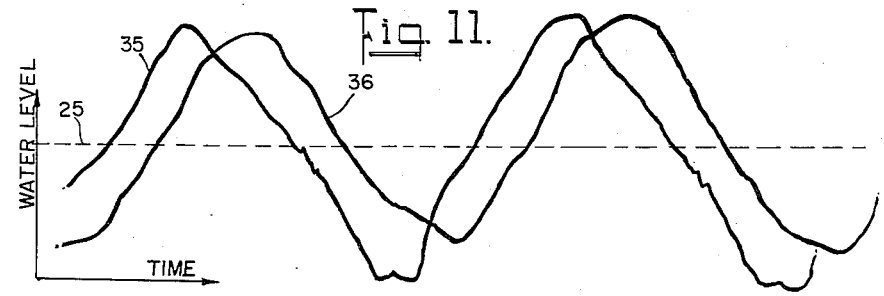
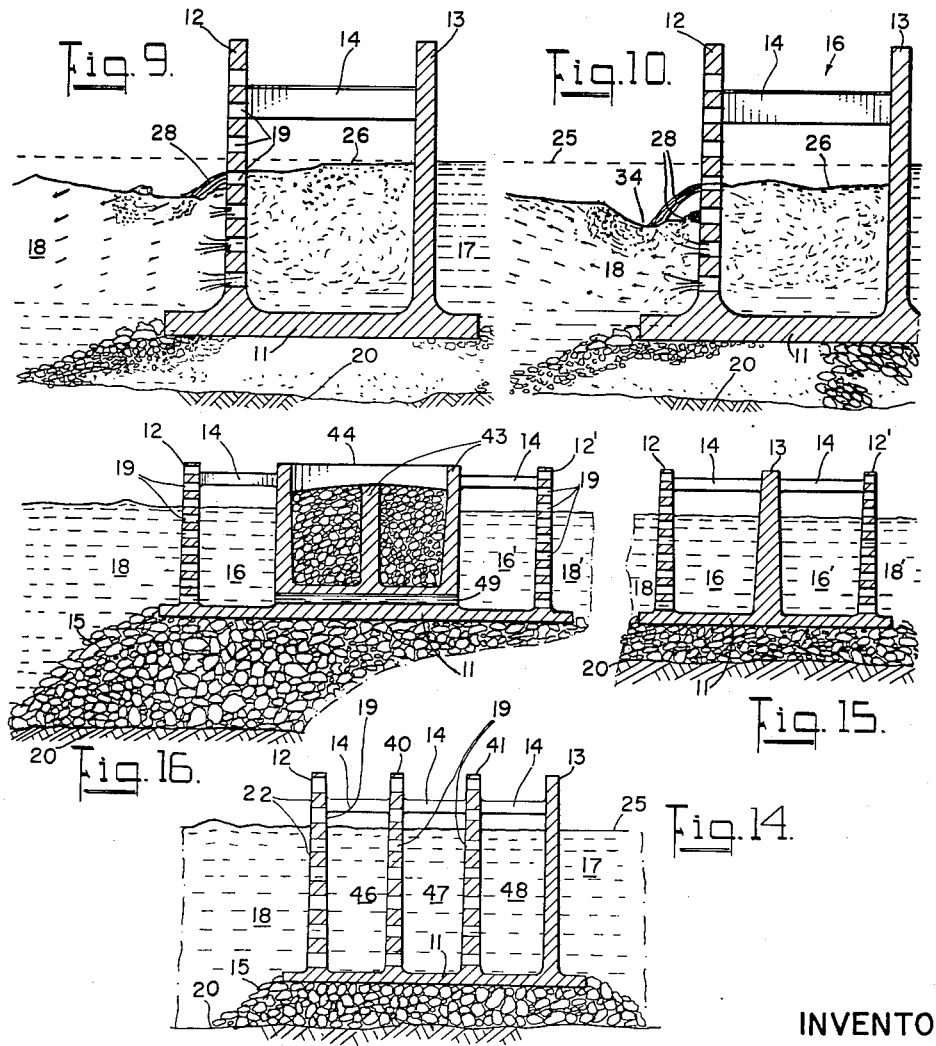
INVENTOR
GERARD EUGENE JARLAN
by R. J. Filipkowski
AGENT

United States Patent Office 3,118,282
Patented Jan. 21, 1964

3,118,282
BREAKWATER STRUCTURES
Gérard Eugène Jarlan, Ottawa, Ontario, Canada, assignor to National Research Council, Ottawa, Ontario, Canada, a body corporate of Canada
Filed May 16, 1960, Ser. No. 29,532
12 Claims. (Cl. 61—4)

This invention relates to marine vertical wall breakwaters and more particularly relates to a hollow caisson structure having a perforated sea wall and an adjacently connected storage chamber for dissipating the energy of incident waves and for reducing the amplitude of clapotis on the seaward side of the structure.

Waves generated at sea by a wind, as when a strong onshore breeze is blowing, approach the shore-line as mixed trains of different wavelengths, directions, and heights. When the waves impinge upon an obstacle such as a sea wall or vertical breakwater, they are reflected and give rise to a system of stationary waves on the seaward side. Such disturbance, termed "clapotis", may be characterized by oscillations whose amplitude approaches twice the height of the incident waves. For the majority of ocean waves having periods between about five and fifteen seconds, it is necessary to build extremely heavy and strong sea wall structures in order to resist the varying dynamic and hydrostatic pressures due to this perturbation. Usually breakwaters constructed in shallower waters, for example in depths lying under eighty feet, are simply piled masses of stone or rubble laid on the sea bottom, presenting a porous upper surface structure of larger blocks piled at random in the openings of which wave energy is partly dissipated. Wave run-up for waves incident upon rubble mound breakwaters of typical slope may be such that the structure requires to be built twenty to thirty feet higher than mean sea level, with a base often spanning two hundred feet or more.

In many harbour locations the great mass of stone of the range of sizes suitable for construction of either vertical wall breakwaters or of capped rubble mounds is not available locally. The wave-resisting upper layers of rubble mounds require to be made of boulders each weighing many tons, so that the construction of massive piles involves heavy capital expenditure where the stone must be hauled from remote quarries.

The present invention seeks to simplify greatly the construction of marine breakwaters by providing a hollow caisson breakwater structure whose mass is relatively small in comparison with conventional sea walls or rubble mounds and which moreover is highly effective for attenuating waves of a broad spectrum of wave periods, having the form of a horizontally extended uncovered tank or chamber comprised of a vertical wall which faces seaward and is extensively apertured over its face, the perforations communicating with the tank or chamber volume.

Applicant has discovered that by exposing a perforated planar vertical front wall of such hollow caisson to be impinged by gravity water waves, the wall having the parameters of thickness and hole dimension so chosen in conjunction with the dimensions of a connected chamber or chambers as to produce optimum attenuation of wave energy in a given spectrum of wave periods, a highly efficient breakwater structure may be realized with great economy of materials.

Such structure moreover produces on its seaward side a clapotis whose amplitude is very much less than the amplitude of clapotis attending any conventional breakwater, and porvides a calm harbour on the landward side of the chamber permitting ships to be moored there.

According to the invention in its simplest embodiment, an improved vertical wall breakwater comprises a pair of horizontally extended vertical wall slabs uniformly spaced apart and integrally joined with a horizontal base member and braced with each other, one wall being perforated by a great number of transverse channels or ducts uniformly distributed over the area of the wall, the perforated wall being located in the path of waves. Each wall of the breakwater extends above mean sea level and extends downward for a distance corresponding to from about one-eighth to about one quarter or more of the wavelength of a wave whose energy is to be attenuated. Such wave may for example have a period of eight seconds, as would be found by observations at a particular location to be protected to be the period of waves having the highest energy among trains impinging on the shore. The spacing between the walls is chosen to be somewhat less than the wall height, and for the example given may be from about twenty five to about forty feet, to form a chamber of any desired length. The ends of such chamber may be closed by end walls, or they may be left open, particularly where the horizontal length of the structure is large.

The maximum effectiveness of a horizontally extended breakwater structure of such form has been discovered to depend upon the combination of a suitable ratio of total duct cross-sectional area to wall area of the frontal (i.e. seaward facing) wall together with a suitably chosen transverse dimension for the connected chamber and the absence of any perforations in the inner (i.e. landward facing) wall of the chamber. Such structure provides a means for absorbing wave energy, a part of the energy of motion of water particles forming an incident wave being periodically transformed into potential energy within the chamber, alternating with periods when the potential energy is transformed to kinetic energy, each transformation being attended by energy losses through turbulence resulting in its ultimate dissipation as heat. When a wave of a train impinges against and rises up the frontal apertured wall, a series of water jets flowing in the apertures is developed due to the hydrostatic head of the rising mass of water, inducing turbulent flow within the jets and throughout the chamber. The energy of fluid motion is rapidly dissipated in vortices, eddies, and like motions, and is further damped by the presence of entrained air.

When the duct dimensions and chamber breadth are properly related to the wave period the chamber fills with a time lag between the time when the ascending incident wave reaches its crest and the time the chamber level rises to its highest point. The chamber empties as the amplitude of the incident wave falls below the chamber level, in a manner similar to the filling action except that the direction of jet flow is reversed to spill fluid out into the seaward zone, thereby inducing an intense turbulence and entraining air at the trough of the wave adjacent the sea wall, the turbulence extending throughout the region in which clapotis would tend to be developed by reflection. The result is therefore to dissipate the wave energy ultimately as heat produced from kinetic energy through turbulence both while the wave amplitude at the front wall is increasing and while it is decreasing, and thereby the amplitude of the clapotis is greatly diminished in comparison with that produced by conventional breakwaters.

The invention may also be put into effect with a chamber subdivided transversely, i.e. in the direction perpendicular to the frontal wall, by a number of apertured vertical walls spaced between the frontal wall and the inner wall of the chamber, whereby the energy dissipation is more gradual.

In order that the practice of the invention may be more fully understood it will be particularly described hereinafter with reference to practical embodiments illustrated by the accompanying figures of the drawing, wherein:

FIG. 1 is a perspective view of a section of a vertical wall breakwater according to the invention, having two walls;

FIG. 2 is an elevation view of a vertical transverse section of a breakwater as in FIG. 1, shown in superimposed relation on a partial cross section of a prior art rubble mound breakwater of equivalent protective function;

Figure 4:
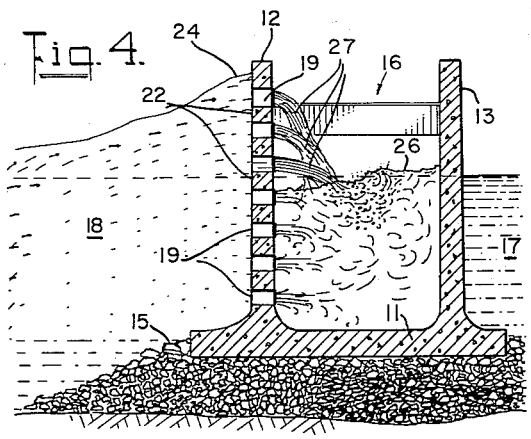

FIGS. 4 to 10 inclusive are elevation views of a transverse section of the breakwater of FIG. 1, showing progressive stages of an impinging wave over the half-period from crest to trough;

FIG. 11 is a graph describing the relationship of water levels outside and inside the chamber for a single period wave;

FIG. 12 is a cross-section taken on the line A—A of FIG. 1, in a diametral plane through a duct in the sea wall;

FIG. 13 is a graph showing reflection coefficients for the breakwater of FIG. 1 for a wave of any period of interest with varying wave camber, and the phase relation of chamber level with respect to incident wave amplitude;

FIG. 14 is an elevation view of a transverse vertical cross section through an alternative form of breakwater having a chamber subdivided by two intermediate apertured walls;

FIG. 15 is an elevation view of a transverse vertical cross section of a two-chamber breakwater for absorbing wave energy arriving from either side; and, FIG. 16 is a modification of the breakwater of FIG. 15 to provide a bypass for current flow through the breakwater.

Wave motion in wave trains propagating in deep water is made up of circular orbital movements of water particles, the orbits having radii at the surface equal to the wave height and diminishing with depth below the level of the mean sea surface. At depths below a half wavelength the particle motion is negligbly small, so that the surface layers of the sea possess the greater part of the wave energy. For example, for waves having a height of twelve feet the zone of appreciable energy of wave motion lies above a depth of about forty feet.

The propagational velocity of unimpeded waves is expressed by the relationship:

$$c_d = \sqrt{\frac{gL_d}{2\pi} \cdot \tan h\left(\frac{2\pi H}{L_d}\right)} \qquad (1)$$

where $c_d$ is the propagational velocity measured along the surface, and hereinafter referred to as the celerity;
$g$ is the acceleration due to gravity;
$L_d$ is the distance between successive wave crests of the same period; and,
$H$ is the vertical distance between mean sea level and the sea bottom.

For waves in very deep water the argument $$\frac{(2\pi H)}{L_d}$$

becomes large and the expression simplifies approximately to:

$$c_o = \sqrt{\frac{gL_o}{2\pi}} \qquad (2)$$

which reduces to:

$$c_o = 2.26\sqrt{L_o} \qquad (3)$$

where $L_o$ is the deep water wavelength.

As waves move into shallower water, where $H$ becomes smaller than $L_d$, the celerity is much decreased to a lower value, which is related according to (1) with depth, and written $c_d$. The period $T$ and wavelength $L_d$ for any given shallow depth $d$ are therefore related according to the equation:

$$c_d = \frac{L_d}{T} \qquad (4)$$

While a wave has its celerity, length, and period determined by (4), it may have any height, except that for a wave camber larger than $L_d/12$, the wave breaks and its energy dissipates. Consequently for wave trains composed of waves having periods within the range from about seven seconds to about twelve seconds in shallow waters the maximum wave heights are such that most of the energy of motion is contained in the zone extending twenty to forty feet in depth.

Referring now to the drawing, one form of a breakwater according to the invention for attenuating energy of incident waves is generally designated at 10, comprising a horizontal support slab 11 having integrally joined vertical sea wall 12 and solid vertical parallel wall 13 rising therefrom. Preferably the walls are braced together intermediate the support slab and their upper margins, as by a transverse integrally formed beam 14 extending between them about ten feet above mean sea level.

The structure may be integral as illustrated, and such unitary form may be realized as a cast structure of reinforced concrete formed in sections, the breakwater being assembled as adjacent sections suitably joined together with cemented joints. The sea wall 12 and inner wall 13 shown in the perspective view, FIG. 1, are made generally coextensive and are extended considerable distances along their length as required. The walls rise a constant distance above the mean sea surface 15, and extend also below the surface, the distances being chosen appropriate to the wave conditions which pertain to the location of the breakwater. In general the horizontal length of the structure will be hundreds or even thousands of feet, and the exposed height will be from about ten to twenty feet above mean sea level so that for the combination of highest tides and waves the upper margins of the walls will substantially remain above water.

The structure is preferably placed on a mattress 15 of broken rock or like material, laid upon the sea bottom 20 to extend beyond sea wall 12 and inner wall 13 a sufficient distance to ensure stability. The depth of such layer is not critical, and the layer need not necessarily be impervious to water.

Chamber 16 formed between the extended pair of opposed walls and bottom slab 11 will be seen to contain a volume of water when filled to mean sea level, indicated at 25, which is separated from the leeward zone 17 except at the chamber ends, and which is in direct communication over the whole of the submerged part of wall 12 with the seaward zone 18 through a multiplicity of ducts 19. Each duct is substantially coextensive with the transverse dimension of the wall 12 and constitutes a short tube as best shown in FIG. 12, having a length equal to or a small multiple greater than one, of the diameter. In one practical embodiment the diameter was three feet, and had a length of 3.5 feet; in general the ratio of length to diameter may range from about 1:1 to about 3.5:1.

The breakwater is located in a position as may be understood by reference to prior art rubble mound 30 shown in FIG. 2, and is so disposed that seaward wall 12 is exposed to trains of incoming waves whose energy is to be absorbed at least in part. Unlike prior art rubble mound breakwaters which require to have a large mass and which cause the incident wave to break upon large random stone blocks, resulting in plunging breakers and high dynamic forces, the breakwater 10 seeks to avoid appreciable wave run-up by transforming potential and kinetic energy of wave motion into controlled kinetic energy and stored potential energy, and by dissipating the potential energy of a volume of water temporarily stored in chamber 16 throughout the seaward zone 18, as will be described more particularly hereinafter.

Figure 3:
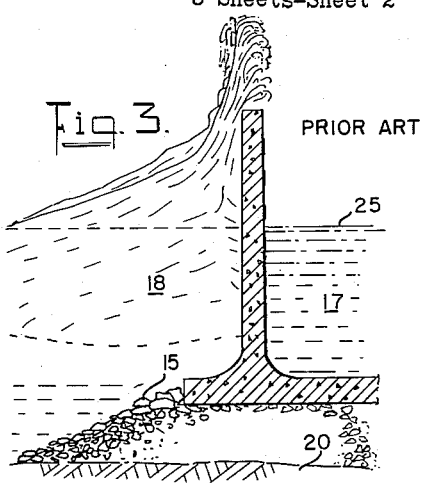
FIG. 3 is an elevation view of a transverse vertical section of a prior art solid vertical wall breakwater, showing total reflection of an incident wave at its crest.

When a wave at its peak amplitude impinges upon the perforated front wall 12, as in FIG. 4, the non-apertured areas thereof indicated at 22 impede the circulatory motion of orbitally moving water particles, which at that stage of the wave have substantially horizontal motion into the wall. As a result the water levels of chamber 16 and seaward zone 18 adjacent wall 12 will be unequal. Due to partial reflection of the incident wave its crest height at the wall will be somewhat higher than the maximum wave height in the open sea, but the increase in height will be minor as contrasted with FIG. 3 showing to the same scale the phenomenon of wave height doubling and leaping resulting from total reflection against a vertical sea wall 12 having its apertures sealed to simulate prior art structure.

Due to the hydraulic head produced by that portion of the wave which lies above the liquid level of the chamber 16, part of the potential energy is transformed into relatively high velocity flow through ducts 19 in the form of large jets spilling into the chamber 16, and the remainder of the energy including the kinetic energy of particle motion is partly dissipated in heat losses in fluid friction at the front wall, and partly reflected seawards, as stated. The supply of water tends to be maintained in part by virtue of the inward horizontal motions of water particles throughout zone 18.

Figure 5:
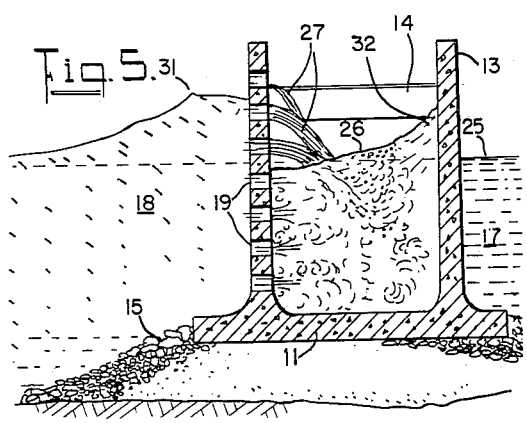
Figure 7:
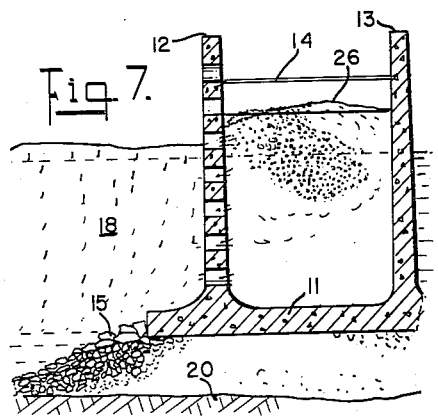
Figure 6:
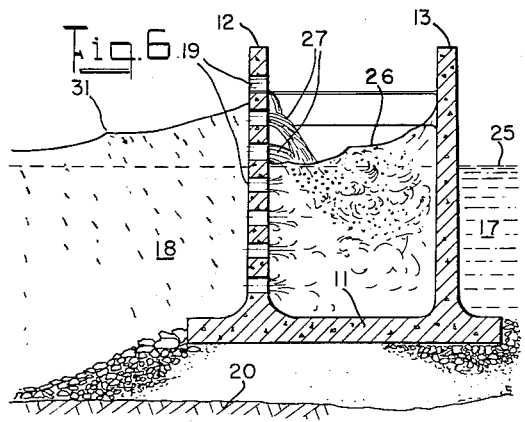
Figure 8:
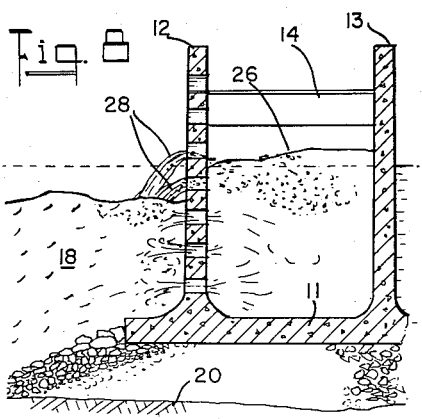

FIG. 5 illustrates the wave state shortly after that shown in FIG. 4. A small clapotis peak 31 has moved away from wall 12, while a surge 32 within chamber 16 has moved to the inner wall 13. At the stage shown the orbital motions of the particles in zone 18 are generally in directions inward and slightly downward and the flow in all of the submerged ducts 19 is at its highest rate, so that the level of water adjacent the inlet ends of the ducts falls while the chamber level is rising.

From an inspection of FIGS. 4 to 7 inclusive it will be made evident that the chamber level continues to increase while the amplitude of the incident wave falls and that at a time when the orbital motions have become vertically downwards the chamber level begins to fall. Thereafter, as will be seen by reference also to FIGS. 8 to 10 the chamber level falls further, lagging behind the wave height at wall 12. Therefore a phase shift may be adduced between the chamber level and the level of the incident wave at the perforated barrier 12. The curves 35 and 36 in FIG. 11 respectively show the height above mean sea level of water at the outside of wall 12 and the height of water in chamber 16, referred to mean sea level shown by the broken horizontal line 25. The curves illustrate the system operating in equilibrium with waves of constant period and amplitude, but are illustrative in general of the differences in level between opposite sides of a perforated vertical wall having a connecting chamber of fixed plan form serving as a temporary storage for water injected from the seaward zone 18, for a broad spectrum of wave periods.

Without in any way restricting the description of the actual relationships and phenomena responsible for the efficaceous operation of a breakwater as shown, it is possible to represent an electrical analogue of the hydraulic system in an embodiment of the invention by a terminating impedance for a transmission line along which a sinusoidal electric wave is propagating. Those skilled in the art will understand that the avoidance of reflection of wave energy in the line requires that it be terminated in a characteristic impedance, usually a resistance. While the actual explanation of the behaviour of the hydraulic system is undoubtedly far more complicated, the analogue of a complex terminating impedance comprised of lumped inductance, resistance, and capacitance connected in series, may be considered as being connected to the transmission line having its counterpart as the sea, for absorbing a part of the energy propagating as ocean waves.

It may be shown that the force acting upon a cross-section of fluid filling any duct tending to produce fluid jets therethrough is:

$$F = \delta.S.V^2 \qquad (5)$$

where $\delta$ is the density of the fluid, i.e. sea water,
S is the orifice cross-sectional area, and
V is the velocity of fluid moving in the duct.
The hydrostatic head D responsible for accelerating the fluid is:

$$D = \delta(h_1 - h_2) \qquad (6)$$

where $h_1$ and $h_2$ are respectively the depths between the axis of a duct 19 and the fluid free surfaces on opposite sides of wall 12, $h_1$ being taken on the seaward side.

The velocity may be determined from (5) and (6) to be:

$$V^2 = k.(h_1 - h_2) \qquad (7)$$

where $k$ is a constant.

The relationship holds for all of the ducts formed in sea wall 12 which lie under water at any instant, and the velocity of freely spilling jets is found directly also.

The parameter $h_1$ for unimpeded Stokaian waves without a reflection component is time-varying in accordance with the harmonic relation:

$$h_1 = A_w.\sin \omega t \qquad (8)$$

where $A_w$ is the wave amplitude measured from crest to mean sea level, and $$\omega = \frac{2\pi}{T}$$

The uppermost holes, i.e those slightly above and below the mean sea level 25 are submerged only part of the time and take part in the energy dissipation process only at intervals. As will be shown hereinafter, the entrainment of large amounts of air by reason of free fall of the fluid streams from the upper holes provides an effective mechanism for damping energy of fluid motion, both within chamber 16 and in the zone 18.

The flow of fluid in all submerged ducts is a mass transport action, resulting in the horizontal displacement of a relatively large volume of water in unit time, when the total cross-sectional area of all submerged ducts is of the order of the total non-apertured areas 22. The ratio of apertured to non-apertured frontal area of wall 12 is not critical, but should not depart more than about 15% from a ratio of unity for a two-walled hollow caisson as described. By choosing relatively large diameters for the ducts 19, for example of the order of 0.01 wavelength for the more energetic waves of a spectrum of periods encountered, the head loss in the channels through fluid friction may be kept small. For waves of eight second period a diameter of three feet or slightly more is suitable, and has been found satisfactory for a broad spectrum of wave periods.

For all appreciable values of $(h_1 - h_2)$ when the structure has the axes of ducts 19 horizontal and the duct length lies in the range from 1.0 to 3.5 times the diameter, the velocity of the water jets will be several feet per second, ranging upward to 30 feet per second or more for highest heads, so that the flow will be turbulent. In a system in equilibrium with a sea excited to wave activity the incident waves will already have some turbulence and entrained air, so that turbulent flow in the ducts will be the rule, and the flow will be at high Reynolds numbers. The jet of water moving through the duct will therefore have substantially uniform velocity over any cross section in a diametral plane except very near the walls 33. The jet velocity in wholly submerged ducts for a harmonically varying difference of heads acting on opposite ends of the ducts, may be shown to be:

$$v = \frac{A_{w1}.\sin \omega t}{\omega} \qquad (6)$$

where $A_{w1}$ represents the harmonically varying head at its maximum amplitude.

Throughout the entire cycle from incidence of the crest of one wave on wall 12 to the arrival of the crest of a succeeding wave, it will be apparent from FIGS. 4 to 10 that energy of oscillatory motion of particles constituting the wave is transformed first to kinetic energy of inflowing jets, until a time when the wave height and chamber level roughly coincide, and that thereafter the chamber retains stored energy as a head larger than the wave height, until reverse jet action again transforms the energy to kinetic form. The figures of drawing illustrate only about 180 degrees of a wave period, e.g. from crest to trough, but the operation for the remainder of the cycle may readily be inferred.

The transverse dimension, i.e. the breadth of the chamber is preferably chosen to lie in the range from about 0.05 to about 0.15 or more of the wavelength of a deep water wave having a period of about 8 seconds, and the depth at mean sea level may be from about one-eighth to about three-eighths of this wavelength.

A very substantial degree of entrainment of air in the masses of water adjacent the wall 12 and within chamber 16 will be evident, this effect resulting from the free falling streams of water spilling from such ducts as have one end uncovered. The action which occurs just prior to and shortly after the trough of the wave reaches wall 12 is particularly effective to diffuse air throughout the seaward zone 18, since the chamber contents are substantially permeated by air bubbles and all ducts inject entrained air into the wave trough. The effect of such air injection is undoubtedly to promote and accelerate dissipation of energy of motion as heat.

It is also to be noted that the instantaneous directions of water particles undergoing orbital path motions in the incident wave are to an important degree aligned with and in the direction of the fluid jets inflowing (FIGS. 4 to 6) while the outflowing jets (FIGS. 8 to 10) approximately track the orbital motion paths of particles of the wave at its trough amplitude. The relationship just described may be inferred to contribute largely to the reduction of clapotis.

The presence of air bubbles and vigorous currents of water moving through ducts 19 may in time erode certain materials of which wall 12 may be constructed; for example, concrete should be protected by suitable linings, as illustrated in FIG. 12, showing a metal cylindric tube having cylindric wall 33 forming the boundary of duct 19. The ends of the tube are preferably flanged radially to lie closely against the front and back faces of wall 12, thereby to protect the edges of the circular openings and to lock the tube in place. Any suitable metal having corrosion-resistant properties in sea water may be employed which will withstand the abrasive forces to which such tube may be subjected due to debris and sand entrained in the water.

For a given relationship of chamber breadth and front wall perforation, it has been found that for any period of interest, e.g. in the range from about one second to about seventeen seconds, the phase shift increases with increasing wave camber up to values of camber associated with a breaking wave. FIG. 11 graphically shows the phase shift between the amplitude of water outside wall 12 (curve 35) and the amplitude of the water inside chamber 16 (curve 36).

In FIG. 13 curve 38 is drawn to display the relationship between wave camber, which is the ratio:

$$2A_w/L_d$$

with respect to phase angle by which chamber level 15 lags the wave amplitude at the front wall.

Curves 38' and 38'' depict the phase shifts pertaining to chambers respectively smaller and larger than that for which curve 38 is plotted.

Curve 39 shown in FIG. 13 relates to wave camber for any period with respect to reflection coefficient, showing that for high wave cambers, i.e. for energetic waves, the percentage of the energy reflected in clapotis is less than for small waves.

Referring now to FIG. 14, there is illustrated a further embodiment of the invention, wherein the space between a frontal apertured wall 12 and an inner solid wall 13 is subdivided by two spaced vertical walls 40 and 41. In this embodiment the tank or chamber is realized as three adjacently located and interconnected chambers 46, 47, and 48, the partitions or septa 40 and 41 being extensively perforated by openings 19 similarly to front wall 12.

In the construction of such alternative form of breakwater the ratio of the unperforated total areas 22 to the area of all duct cross sections for wall 12 may be made smaller than unity, i.e., 60% or more of the frontal wall area may be constituted as circular apertures 19. Each of the partition walls or septa 40 and 41 may have equal total areas of perforated and unperforated wall portions, or the percentage areas of apertures for the three perforated walls 12, 40, and 41 may range in decreasing magnitude, wall 41 for example having only 40% of its surface constituted by apertures. Such form of breakwater will have a phase lag from chamber to chamber and the motion within the space bounded by walls 12 and 13 will be more controlled than in the single chamber embodiment. The percentage coefficient of reflection for incident waves may, for suitable relationships of aperture ratio and breadths for each chamber, be smaller than for the single chamber form.

In some locations it may be desirable to protect zones adjacent a breakwater on either side, as for example a ferry route between land masses separated by a strait, subject to storms and high wave conditions from opposite directions. The single breakwater construction of FIG. 1 may be doubled as in FIG. 15 to provide two back-to-back separate breakwaters, each having respective perforated walls 12 and 12' exposed to incidence of waves from adjoining seaward zones 18, 18'. A solid intermediate vertical wall 13 extending coextensively with the outer walls in both the horizontal and vertical directions separates the respective chambers 16, 16'. In all respects this construction conforms to that previously described, and the choice of dimensions and wave action is as stated hereinbefore.

It will be understood that such structure may extend short of land masses at opposite sides of a strait or passage, or it may be joined at one end with one of them, to permit vessels and small craft to proceed along either side depending upon wind and sea conditions.

In the modification shown in FIG. 16, a dual breakwater comprises the perforated pair of outer walls 12, 12' as in FIG. 16, supported from a horizontal bottom slab 11, supported on a submerged causeway 15 which may be any depth. Such structure has application to the rebuilding of existing causeways subject to high costs of annual maintenance of capping stone, eroded by wave action from either direction along a strait or passage between separated land masses. The intermediate wall 53 is made relatively broad, to support roadways and/or railways on its upper face 54. Where there is a strong tidal flow transversely to the breakwater length, or where the structure is erected across an estuary, provision is made to pass a current of water through the intermediate wall. This may take the form of a tier of ducts 49 communicating between the chambers 16, 16' and placed adjacent the lower margin of wall 53 to reduce the transference of wave energy between zones 18, 18' while allowing a considerable flow through the structure. Preferably the length to diameter ratio of ducts 49 should be large, for example between about 5:1 and about 50:1.

I claim:

1. A breakwater comprising a pair of spaced apart vertical walls extending horizontally and supported on sea bottom and extending above the highest wave level, one of the walls being disposed in the path of waves and having from about 40 to about 60 percent of its area in the form of transverse ducts uniformly spaced apart and coextensive with the wall thickness and having a ratio of axial length to diameter ranging from about 1.0 to about 3.5, the other wall being unperforated and spaced from said one wall to define a chamber between said pair of walls having a breadth such that for a train of sea waves incident on said perforated wall having periods in a spectrum ranging upwards from about one second to about seventeen seconds the oscillating water levels at opposite faces of said perforated wall have a substantial phase difference at the frequency of the longest period component wave.

2. A breakwater as in claim 1 wherein said walls are spaced apart a distance from about sixteen to about seventy feet and said perforated wall has a thickness of the order of about 0.01 wavelength of a wave component having a period of eight seconds.

3. A breakwater for dissipating the energy of trains of sea waves having a spectrum of periods in the range from about one second to about seventeen seconds, comprising a hollow caisson open over its upper side to atmosphere and having a closed bottom, and supported on the sea bed and having a front wall and a rear wall spaced parallelly apart, said front wall being vertical and apertured over its entire area by a large plurality of ducts of circular cross-section horizontally coextensive with the wall thickness and connecting the interior of the caisson with the sea and extending above the highest waves, said front wall having a submerged portion measuring from about one-eighth to about three-eighths of the deep water wavelength of a wave having a period of eight seconds, said rear wall being unperforated and being spaced from said front wall a distance in the range from about 0.05 to about 0.15 wavelengths of said wave.

4. A breakwater as in claim 3 wherein the front wall has a thickness of the order of 0.01 wavelength of said wave and said ducts have a diameter from about 0.003 to about 0.01 times said wavelength, and said front wall has an unapertured cross-sectional area from about 60 to about 40 percent of its projected elevational area.

5. A structure for absorbing energy of gravity type sea waves comprising a pair of horizontally extended vertical walls rising above mean sea level and extending downwards to a mattress of rubble laid on sea bottom, said walls having a submerged depth of from about one-eighth to about three-eighths of the deep water wavelength of a wave having a period of about eight seconds, said walls having transverse dimensions of the order of 0.01 wavelength and an intermediate vertical thick wall coextensive with said pair of walls and spaced equidistantly between them to provide a pair of like chambers having a transverse dimension of from about 0.05 to about 0.15 times said wavelength, said chambers being connected with the sea by a large plurality of horizontal ducts distributed uniformly over the area of each of said pair of walls, said ducts being coextensive with the thickness of each of said pair of walls and having axial lengths ranging from 1.0 to 3.5 times the duct diameter, said duct diameter being of the order of 0.01 times said wavelength, and said chambers being connected with each other only by a row of transverse flow channels extending transversely through the lowermost portion of the intermediate wall, said flow channels having a length to diameter ratio greater than 5:1 but less than about 50:1.

6. A breakwater comprising a pair of spaced-apart vertical walls extending horizontally and supported on sea bottom and rising above the highest wave level, one of the walls being disposed in the path of deep water wave trains and having from about 40 percent to about 60 percent of its area apertured by cylindrical ducts uniformly spaced apart in rows and tiers and having diameter and length dimensions of the order of three feet, the other wall being unperforated and spaced from said one wall by from about 16 to about 70 feet distance to define a surge chamber between said pair of walls having an oscillating water level out of phase with the oscillating water level at the outside of said perforated wall, said ducts guiding horizontal jet flow therethrough in accordance with differences in said oscillating levels.

7. A breakwater having a low reflection coefficient comprising a pair of horizontally extensive spaced-apart vertical walls supported on the sea bed defining a chamber located in a deep body of water, comprising a front wall disposed for incidence of deep water waves and a solid back wall, said front wall having a large plurality of short ducts opening therethrough spaced uniformly over its area for freely directing flow of water as horizontal jets alternately into and out of said chamber whenever the wave level adjacent said front wall is respectively greater or less than the water level in the chamber.

8. A breakwater as claimed in claim 7 wherein said walls are parallel and extend above highest wave level so that the upper jets spill air-entraining free streams alternately into and out of said chamber.

9. A breakwater as claimed in claim 7 wherein said walls are joined by a slab base resting on the bottom of said body of water and are further joined by transverse bracing structure above mean water level.

10. A breakwater as claimed in claim 7 wherein the duct cross-sectional areas comprise from about 40 to about 60 percent of the front wall area, the ratio of duct length to diameter lies in the range from about 1 to about 3.5, and said solid wall is spaced by from about 16 to about 70 feet from the front wall.

11. A breakwater comprising a pair of horizontally elongate spaced-apart vertical walls defining a chamber located in a deep body of water having said walls extending from the bottom above the surface of the body and having a front wall lying in the propagation paths of advancing deep water waves in said body and having a large plurality of openings therethrough spaced uniformly in tiers and rows over its entire area, the other wall of the pair being solid and spaced by from about 16 to about 70 feet from said front wall, said front wall having a thickness about three feet and said openings being cylindrical tubes with a length-to-diameter ratio in the range from about 1 to about 3.5, said tubes having horizontal axes.

12. A breakwater as claimed in claim 11 wherein said tubes are terminated by integral flanges radially outturned and secured to opposite faces of said front wall.

References Cited in the file of this patent

UNITED STATES PATENTS

| 1,521,922 | Wilson et al. | Jan. 26, 1925 |
| 2,410,338 | Craine | Oct. 29, 1946 |
| 2,474,786 | Humphrey | June 28, 1949 |
| 3,011,316 | Wilson | Dec. 5, 1961 |

FOREIGN PATENTS

| 407,575 | France | Jan. 4, 1910 |
| 730,189 | France | May 9, 1932 |
| 739,080 | Germany | Sept. 10, 1943 |
| 1,095,527 | France | Dec. 22, 1954 |